F. J. COLE.
DRIFTING VALVE FOR LOCOMOTIVES.
APPLICATION FILED NOV. 19, 1912.
1,058,352.
Patented Apr. 8, 1913.
3 SHEETS—SHEET 1.
-FIG. 1.-
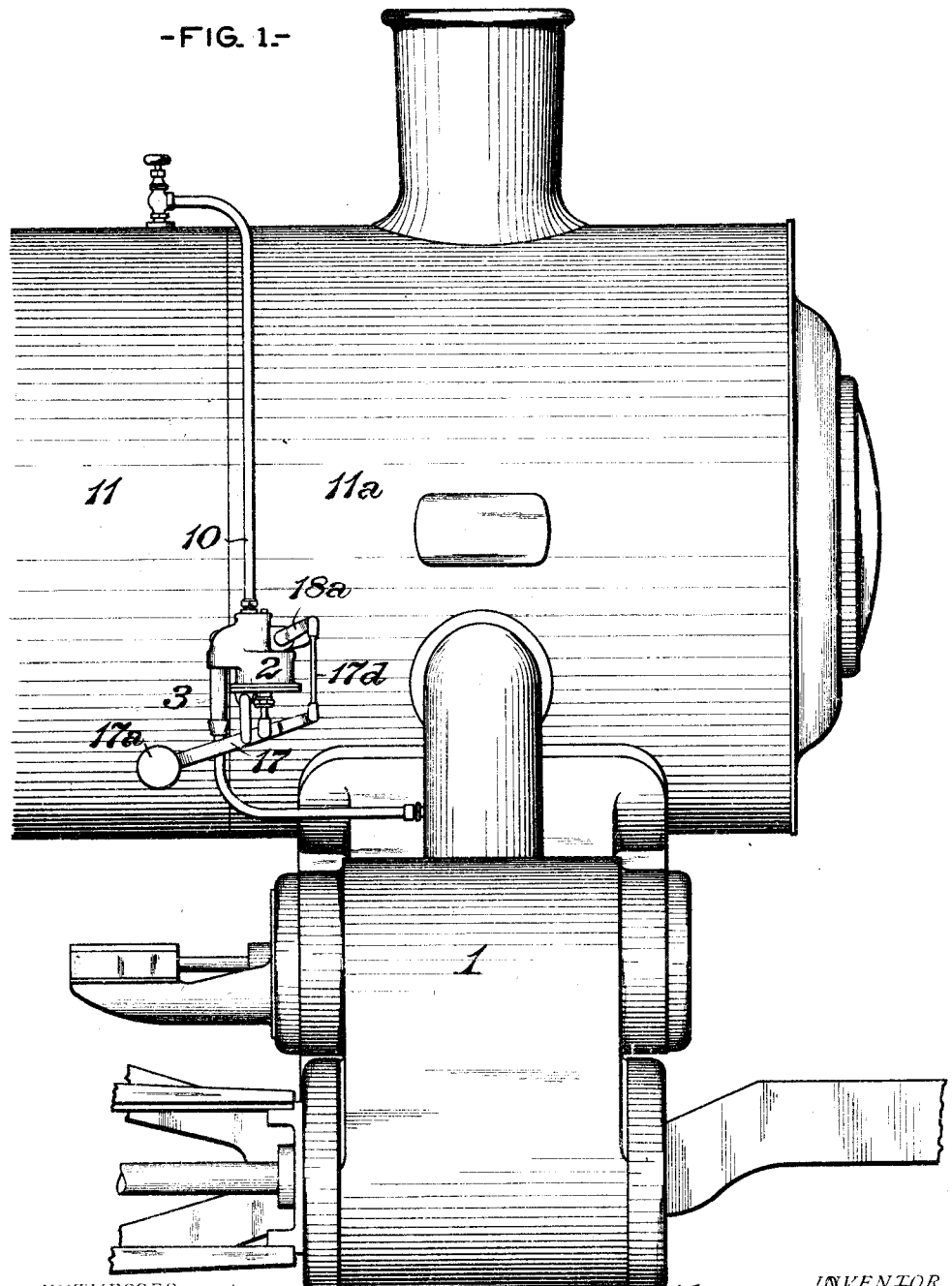

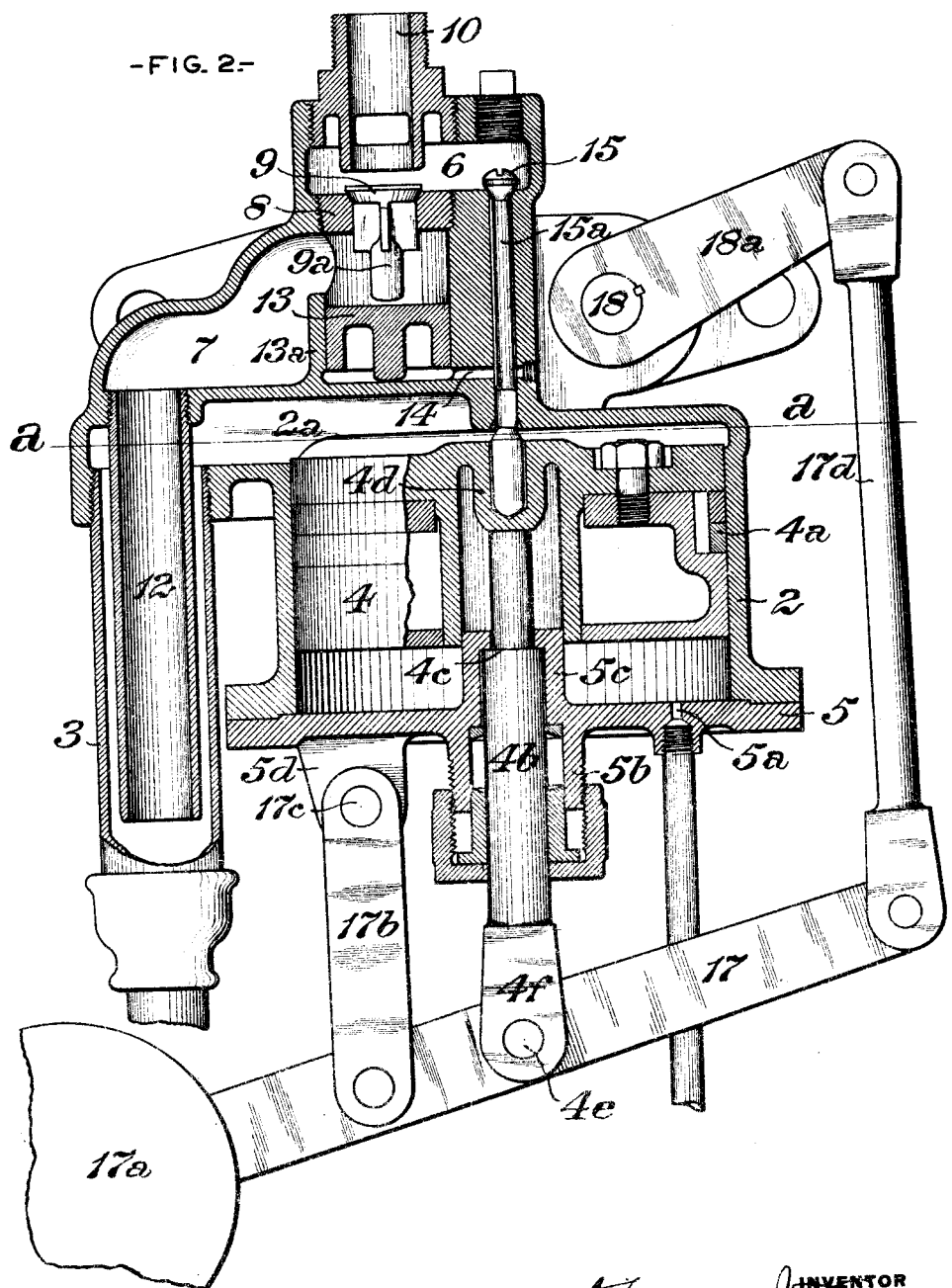

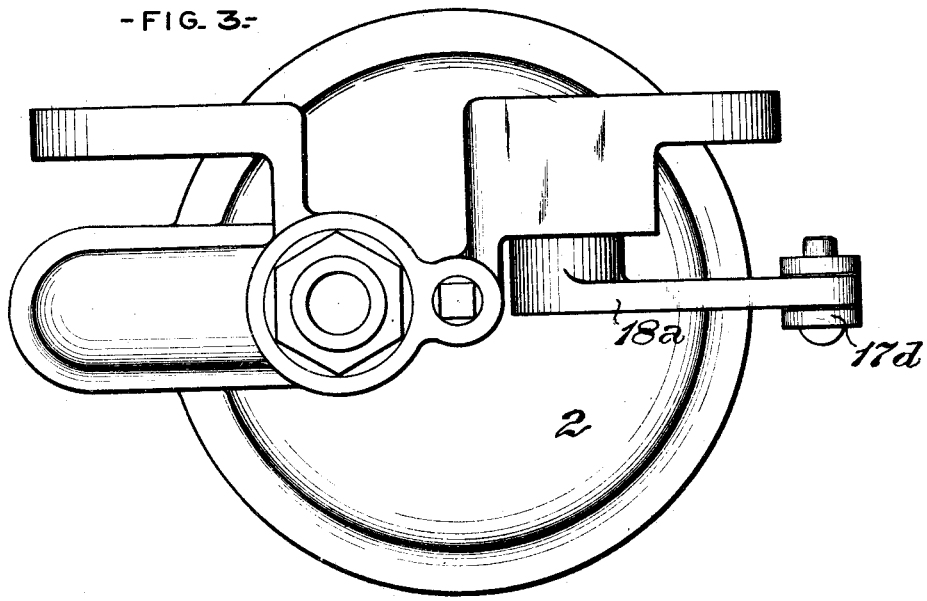
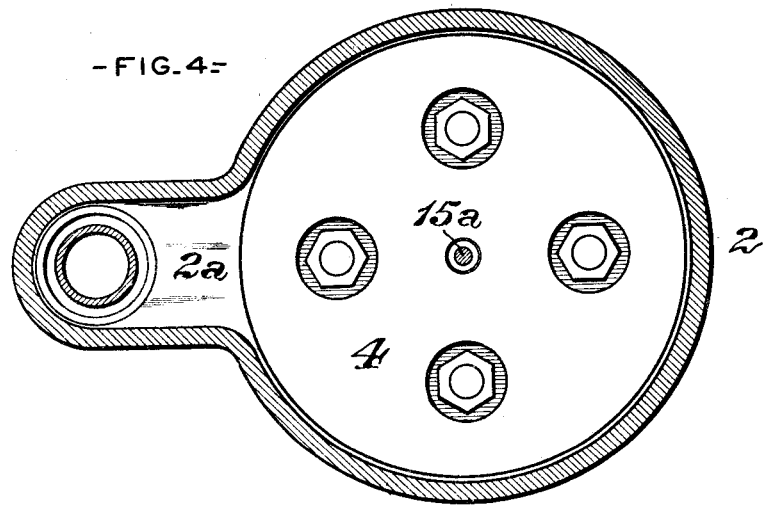

UNITED STATES PATENT OFFICE.

FRANCIS J. COLE, OF SCHENECTADY, NEW YORK.

DRIFTING-VALVE FOR LOCOMOTIVES.

1,058,352.  Specification of Letters Patent.  Patented Apr. 8, 1913.

Application filed November 19, 1912. Serial No. 732,207.

*To all whom it may concern:*

Be it known that I, FRANCIS J. COLE, of Schenectady, in the county of Schenectady and State of New York, have invented a certain new and useful Improvement in Drifting-Valves for Locomotives, of which improvement the following is a specification.

The object of my invention is to provide simple and inexpensive means for automatically effecting the admission of a limited quantity of steam, directly from the boiler to the valve chests and cylinders of a locomotive engine, during the periods in which the locomotive is "drifting" or running with its throttle closed, in order to prevent the formation of a vacuum in the cylinders and prevent overheating and undue wear of the parts which are in frictional contact, and also to effect the automatic closure of the superheater damper, while drifting.

The improvement claimed is hereinafter fully set forth.

In the accompanying drawings: Figure 1 is a side view, in elevation, of so much of the forward portion of a locomotive engine as illustrates the application of my invention thereto; Fig. 2, a vertical central section, on an enlarged scale, through the drifting valve mechanism; Fig. 3, a plan or top view of the same; and, Fig. 4, a horizontal section on the line *a a* of Fig. 2.

It is well known to those familiar with the operation of locomotives, that the wear on packing rings and cylinder and valve chests rubbing surfaces is materially greater when the steam is shut off by the closure of the throttle valve, and the locomotive is drifting, than when steam is passing through the valve chests and cylinders under ordinary running conditions. This is due to the fact that, in the latter case, the exhaust steam carries off the excess heat produced by the friction of the wearing parts and keeps their temperature within reasonable limits. The friction of the valves and pistons, when the steam is shut off and the locomotive is drifting down long grades, produces considerable heat, whereby the temperature of the wearing parts in abnormally raised, resulting in undue wear, notwithstanding the fact that the quantity of oil used may be the same in both cases. The condition above stated is especially true in the case of locomotives which are equipped with superheaters, the parts subject to wear being much hotter than in locomotives using saturated steam, and, consequently, a smaller increase in temperature due to friction is more quickly effective in the wear of cylinders, packing rings, bushings, etc., than when saturated steam is used. A method which has been practised, in the endeavor to obviate or reduce the objectionable results referred to, is to slightly open or "crack" the throttle valve, when drifting down long grades, in order to admit a small quantity of steam to the valve chests and cylinders. This practice is, however, for obvious reasons, undesirable, and particularly so in the case of locomotives equipped with superheaters, by reason of the high heat of the superheated steam admitted to the cylinders.

When a locomotive is drifting, there then being no steam in the cylinders, the movements of the pistons therein produce a vacuum in each of the valve chests, and for this reason, air admission or so called vacuum valves are usually fitted on the valve chests. The function of these valves is to admit a small quantity of air to the cylinders, in order to reduce the vacuum therein and also to prevent hot gases and cinders from being drawn from the smoke box into the exhaust pipes. The area of these vacuum valves is necessarily so small that it is impossible to supply air in sufficient quantities to the valve chests to prevent the production of a partial vacuum, and, as another means of prevention, by-pass valves are often applied.

In a separate application filed by me of even date herewith, Ser. No. 732,206, I have set forth and claimed a drifting valve appliance which is designed to utilize the tendency to the formation of a partial vacuum in the cylinders and valve chests to effect the automatic supply of steam to the cylinders when the locomotive is drifting.

My present invention, while based upon the same general operative principle, applies it under different structural features, and is, further, specially designed for operation in locomotives fitted with superheaters, in which it performs the additional function of automatically operating the superheater damper.

Referring to the drawings, in the practice of my invention, I locate in any convenient position adjacent to each of the valve chest, 1, of the locomotive, a piston chamber, 2, that is to say, a separate piston chamber is provided for each of the valve chests. A piston, 4, provided with suitable packing rings, 4ᵃ, is fitted to reciprocate in the piston chamber, the lower end of which is closed by a removable head, 5, having one or more air openings, 5ᵃ, which may, if desired, be piped to any location at which dust is not liable to enter, as indicated in Fig. 2. A piston rod, 4ᵇ, passes through a properly packed stuffing box, 5ᵇ, in the head, 5, said piston rod being turned down at and for some distance from its upper end, to provide upon it a shoulder 4ᶜ, which abuts against an annular stop, 5ᶜ, formed or fixed centrally on the head, 5, and thereby limits, to the proper degree, the upward traverse of the piston rod. The upper end of the piston rod abuts against the closed lower end of a socket, 4ᵈ, formed centrally on the piston.

A lever, 17, having a weight, 17ᵃ, fixed on one of its ends, is fulcrumed, through a link, 17ᵇ, on a pin, 17ᶜ, fixed in lugs, 5ᵈ, on the lower side of the head, 5, and the opposite end of the lever, 17, is coupled, by a link, 17ᵈ, to an arm, 18ᵃ, on one end of the shaft, 18, of the super-heater damper, which shaft is, as in ordinary practice, journaled in bearings in the smoke box, 11ᵃ, of the boiler, 11, of the locomotive. The lever, 17, is also coupled by a pin, 4ᵉ, to a jaw, 4ᶠ, on the lower end of the piston rod, 4ᵇ, this connection being made between the links, 17ᵇ, and 17ᵈ. Under the construction above described, downward movement of the lever, 17, to the left, which is effected by the downward movement of the piston, 4, will swing the superheater damper shaft, 18, in direction and extent to close the superheater damper, and movement of the lever in the opposite direction, which is effected by the gravity of the weight, 17ᵃ, will swing the shaft, 18, in direction and extent to open the superheater damper.

A steam supply chamber, 6, and a steam delivery chamber, 7, are fixed to the top of the piston chamber, 2, being preferably, as shown, formed integral therewith, and being separated by a partition, 8, in which there is formed an opening controlled by a steam supply valve, 9, of the puppet type, which seats downwardly, or in the direction of the steam delivery chamber, 7. A passage, 2ᵃ, leads out of the upper end of the piston chamber, 2, and is connected, by a pipe, 3, with the adjacent distribution valve chest, 1. The steam supply chamber, 6, communicates, by a pipe, 10, with the steam space of the boiler, 11, and a pipe, 12, leads from the steam delivery chamber, 7, into the pipe, 3, leading to the valve chest, within which pipe it terminates, by an open end, a short distance, as, say, about five or six inches, below the passage, 2ᵃ, this relative disposition of the pipes, 12, and 3, being made for the purpose of enabling the former to act in the manner of a jet nozzle for momentarily inducing an increase of vacuum above the piston, 4.

A piston, 13, of materially greater diameter than that of the steam supply valve, 9, is fitted in a chamber, 13ᵃ, below, and substantially in line axially with, said valve, the top of the piston being normally in contact with, or slightly below, the downwardly projecting stem, 9ᵃ, of said valve, so as to be adapted to unseat it by its upward movement. A passage, 14, leads from the steam supply chamber, 6, to the piston chamber, 13ᵃ, said passage being controlled by a small pilot valve, 15, the stem, 15ᵃ, of which extends downwardly to or near the bottom of the central socket, 4ᵈ, of the piston.

In the operation of the appliance above described, assuming the locomotive to be standing and the throttle to be opened, steam is admitted to the distribution valve chests, and thence, through the pipes, 3, to the piston chambers, 2, above the pistons, 4, forcing said pistons downwardly, and through their connections with the superheater damper shaft, 18, opening the superheater damper. When the throttle is closed, the weights, 17ᵃ, force the pistons upward and close the superheater damper. When the engine is drifting, with throttle closed, especially on long grades, the weights force the pistons upward until the motion of the piston rod is arrested by the contact of its shoulder, 4ᶜ, with the stop, 5ᶜ, thereby preventing further movement of the superheater damper shaft. A partial vacuum being formed in the valve chests by the movements of the pistons therein, as preliminarily described, a corresponding reduction of pressure results in each of the piston chambers, above the piston, 4, thereof, which is thereupon forced upwardly by the higher atmospheric pressure below it, of the air which enters through the opening, 5ᵃ. The upward movement of the piston unseats the pilot valve, 15, thereby admitting steam from the pipe, 10, and chamber, 6, to the piston chamber, 13ᵃ, below the piston, 13. Said piston is thereby moved upwardly, unseating the supply valve, 9, and admitting steam from the boiler, through the pipe, 10, chambers, 6, and 7, and pipes, 12, and 3, to the valve chest. The jet action of the downwardly extending pipe, 12, induces, momentarily, an increased vacuum above the piston. When the throttle is opened for the purpose of working the locomotive under steam, the piston, 4, is depressed by the then higher pressure above it, and the valves, 15, and 9, are seated by the same higher pressure, the parts being thereby returned to the normal positions shown in Fig. 2.

I claim as my invention and desire to secure by Letters Patent:

1. In a drifting valve appliance for locomotives, the combination of a passage for establishing communication between a locomotive boiler and a distribution valve chest, a valve controlling said passage, a superheater damper shaft, and means for automatically opening said valve and moving said shaft into position to close the damper, when the locomotive is drifting with throttle closed.

2. In a drifting valve appliance for locomotives, the combination of a passage for establishing communication between a locomotive boiler and a distribution valve chest, a valve controlling said passage, a superheater damper shaft, means, actuated by atmospheric pressure, for automatically opening said valve when the locomotive is drifting with throttle closed, and means, actuated by gravity, for automatically moving said shaft into position to close the damper, when the locomotive is drifting with throttle closed.

3. In a drifting valve appliance for locomotives, the combination of a passage for establishing communication between a locomotive boiler and a distribution valve chest, a valve controlling said passage, a superheater damper shaft, a movable abutment, actuated by atmospheric pressure, for automatically opening said valve when the locomotive is drifting with throttle closed, and a gravity actuated lever and link mechanism for automatically moving said shaft into position to close the damper, when the locomotive is drifting with throttle closed.

4. In a drifting valve appliance for locomotives, the combination of a passage for establishing communication between a locomotive boiler and a distribution valve chest, a valve controlling said passage, a superheater damper shaft, a movable abutment, actuated by atmospheric pressure, for automatically opening said valve when the locomotive is drifting with throttle closed, a gravity actuated lever and link mechanism for automatically moving said shaft into position to close the damper, when the locomotive is drifting with throttle closed, and intermediate connections between said lever and link mechanism and said movable abutment, whereby the superheater damper shaft is moved by said abutment into position to open the damper when the throttle is opened for working the locomotive under steam.

5. In a drifting valve appliance for locomotives, the combination of a passage for establishing communication between a locomotive boiler and a distribution valve chest, a valve controlling said passage, a superheater damper shaft, a movable abutment, actuated, in one direction, by atmospheric pressure, to automatically open said valve when the locomotive is drifting with throttle closed, and actuated in the opposite direction by steam pressure, a gravity actuated lever and link mechanism, coupled to the superheater damper shaft, and intermediate connections between said lever and link mechanism and said movable abutment, whereby the superheater damper shaft is moved by said abutment into position to open the damper when the throttle is opened for working the locomotive under steam, and is moved by the lever and link mechanism into position to close the damper when the throttle is closed.

6. In a drifting valve appliance for locomotives, the combination of a passage for establishing communication between a locomotive boiler and a distribution valve chest, a valve controlling said passage, a superheater damper shaft, a piston chamber which is open at one end to said passage and at the other to the atmosphere, a piston fitted to reciprocate in said chamber, means actuated by the movement of the piston by atmospheric pressure, for opening said valve, a double armed lever carrying a weight on one end and having its opposite end coupled to the superheater damper shaft, and a piston rod abutting at one end on the piston and having its opposite end coupled to the lever.

FRANCIS J. COLE.

Witnesses:
S. W. TYLER,
F. F. SCOVILL.